United States Patent
Kita

[11] Patent Number: 5,197,429
[45] Date of Patent: Mar. 30, 1993

[54] POSITION SENSING ARRANGEMENT FOR USE IN FUEL INJECTION PUMP OR THE LIKE

[75] Inventor: Toru Kita, Yokosuka, Japan
[73] Assignee: Nissan Motor Co. Ltd., Japan
[21] Appl. No.: 557,102
[22] Filed: Dec. 1, 1983

[30] Foreign Application Priority Data

Dec. 27, 1982 [JP] Japan ............... 57-227139

[51] Int. Cl.⁵ .............. F02D 31/00; H01G 5/04
[52] U.S. Cl. .................. 123/357; 123/494; 73/119 A; 361/292
[58] Field of Search ............... 123/494, 357, 449, 358, 123/359, 449, 503; 73/119 A; 361/292; 340/870.37; 324/660

[56] References Cited

U.S. PATENT DOCUMENTS

| | | | |
|---|---|---|---|
| 3,312,892 | 4/1967 | Parnes | 340/870.37 |
| 3,630,643 | 12/1971 | Eheiom | 123/357 |
| 3,702,957 | 11/1972 | Wolfendale | 361/292 |
| 4,036,193 | 7/1977 | Kobayashi | 123/357 |
| 4,206,401 | 6/1980 | Meyer | 324/61 |
| 4,462,361 | 7/1984 | Karle | 123/494 |

FOREIGN PATENT DOCUMENTS

| | | | |
|---|---|---|---|
| 3019343 | 11/1981 | Fed. Rep. of Germany . | |
| 2473626 | 7/1981 | France . | |
| 0075928 | 6/1981 | Japan | 123/357 |
| 0049032 | 3/1982 | Japan | 123/357 |
| 1279984 | 6/1972 | United Kingdom | 324/660 |

*Primary Examiner*—Carl Stuart Miller
*Attorney, Agent, or Firm*—Leydig, Voit & Mayer

[57] ABSTRACT

A position sensor for a valve or the like includes a first electrode disposed about the valve or a member associated therewith in a manner that the interfacial area between the valve and the electrode remains constant irrespective of the position of the valve. One or more second electrodes are disposed in a manner that the interfacial area between the valve and the electrode varies with the position of the valve. By sensing the change in electrostatic capacity between the electrodes the position of the valve may be detected. The sensor finds application in a fuel injection pump wherein it permits a very compact solenoid (motor)/sensor arrangement.

5 Claims, 3 Drawing Sheets

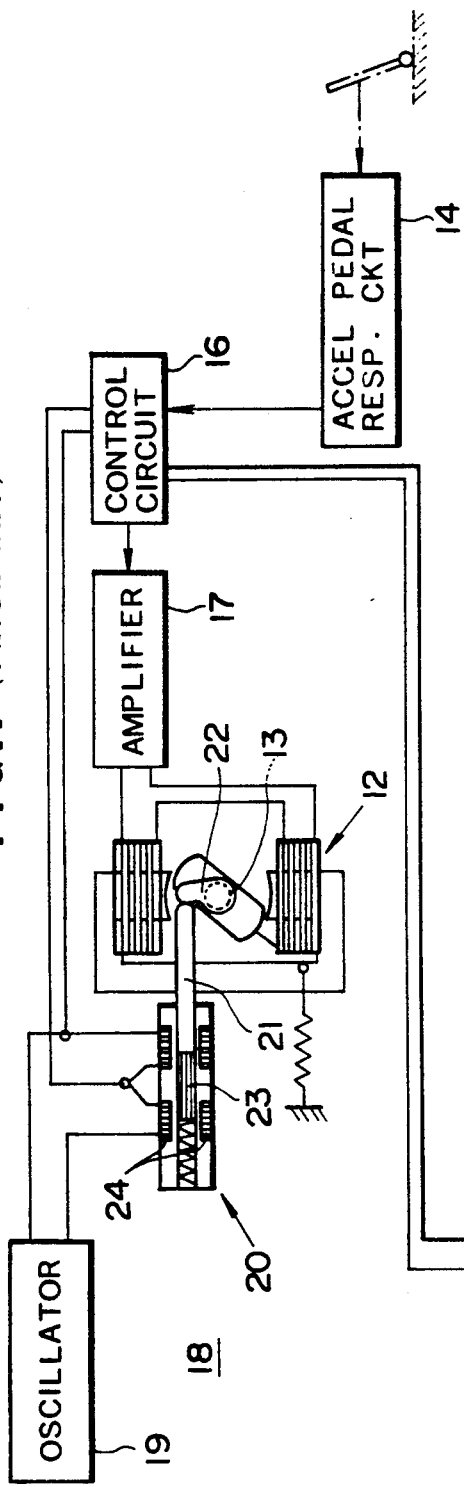
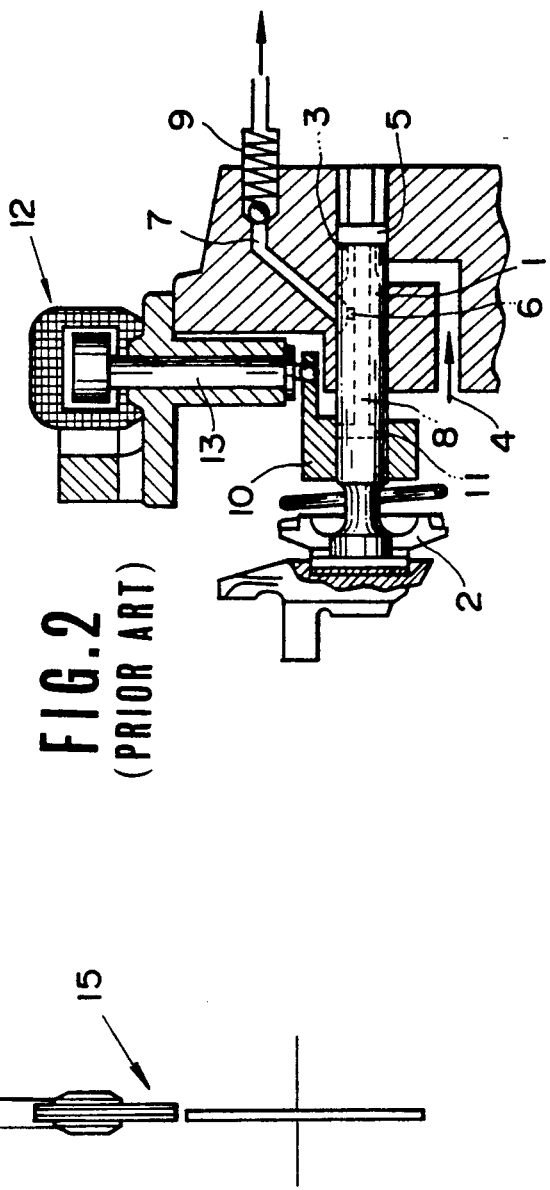
FIG.1 (PRIOR ART)
FIG.2 (PRIOR ART)

POSITION SENSING ARRANGEMENT FOR USE IN FUEL INJECTION PUMP OR THE LIKE

BACKGROUND OF THE INVENTION

1. Field of the Invention

The present invention relates generally to a position detecting arrangement and more specifically to an arrangement suitable for use in a fuel injection pump or the like.

2. Description of the Prior Art

In a previously proposed arrangement shown in FIGS. 1 and 2 of the drawings, a fuel injection pump (partially shown) includes a plunger 1 which is reciprocated by a cam disc 2 driven in synchronism with the crankshaft of an engine (not shown). The operation of the pump is such that during the induction stroke the plunger 1 is moved leftward (as seen in the drawings) permitting an axial groove 3 to register with a fuel inlet passage 4 whereby fuel is introduced into a variable volume chamber 5 defined between the plunger 1 and the bore in which the plunger is received. During the discharge stroke, the plunger is moved to reduce the volume of the variable volume chamber 5 compressing the fuel therein. Upon sufficient movement of the plunger into the bore, a radial bore 6 registers with an outlet passage 7 permitting the fuel compressed in the variable volume chamber to be discharged through an axial bore 8 to a fuel injector (not shown) via the outlet passage 7 and a check valve 9.

A discharge volume control valve 10 is slidably disposed about one end of the plunger 1 in a manner to control a drain passage 11 which fluidly communicates with the axial bore 8. The position of the valve 10 and therefore the amount of fuel permitted to be discharged via the drain passage 11, is controlled by a torque motor 12. A shaft 13 of the torque motor 12 is provided at one end therewith a crank or sectoral member which is connected to the valve 10 through a ball joint. With this arrangement, the rotation of the shaft 13 is translated into axial movement of the valve 10.

Energization of the torque motor 12 is controlled by a control arrangement including an accelerator pedal position responsive circuit 14, a engine revolution speed detector 15, a control circuit 16, an amplifier 17 and a feed-back control arrangement generally denoted by the numeral 18, connected as shown. The latter mentioned arrangement (18) includes an oscillator 19 and a position sensing device 20 including a shaft 21 movably under the influence of a cam 22 fixedly mounted on the afore-mentioned shaft 13. The shaft 21 is provided with a ferro-magnetic core 23 which is adapted to reciprocate backward and forth within induction coils 24 operatively connected to the oscillator 19.

However, this arrangement has suffered from the drawback that as the position of the valve member is sensed using an indirect inductance method, the above described apparatus has lacked the required degree of accuracy and thus induced poor injection quantity control due to insufficiently precise feedback control.

SUMMARY OF THE INVENTION

It is an object of the present invention to provide a position sensor which accurately indicates the position of a valve member or the like and which advantageously, but not necessarily, lends itself to compact arrangements.

In brief, the present invention features a position sensor for movable member such as a valve or the like and which includes a "first" electrode disposed about the valve (or a member associated therewith) in a manner that the interfacial area between the valve and the electrode remains constant irrespective of the position of the valve, and one or more "second" electrodes which are disposed in a manner that the interfacial area between the valve and same varies with the position of the valve. By sensing the change in electrostatic capacity between the electrodes the position of the valve may be detected. The sensor, due to its nature finds application in devices such as fuel injection pumps wherein it permits very compact solenoid (motor)/sensor arrangements.

More specifically, the present invention takes the form of a device including a movable member and an arrangement for sensing the position of the member, the latter comprising: a first electrode disposed in close proximity of the movable member and in a manner that the interfacial area defined between it and the member remains constant irrespective of the position of the member, a second electrode disposed in close proximity of the member and in a manner that the interfacial area defined between it and the member varies with the position of the member, and a circuit for outputting a signal indicative of the position of the member, the circuit being responsive to a parameter which varies with the difference in interfacial area defined between (a) the first electrode and the member and (b) the second electrode and the member.

BRIEF DESCRIPTION OF THE DRAWINGS

The features and advantages of the arrangement of the present invention will become more clearly appreciated from the following description taken in conjunction with the accompanying drawings in which:

FIGS. 1 and 2 show the prior art arrangement discussed briefly in the opening paragraphs of the present disclosure;

DESCRIPTION OF THE PREFERRED EMBODIMENTS

Figure 3:
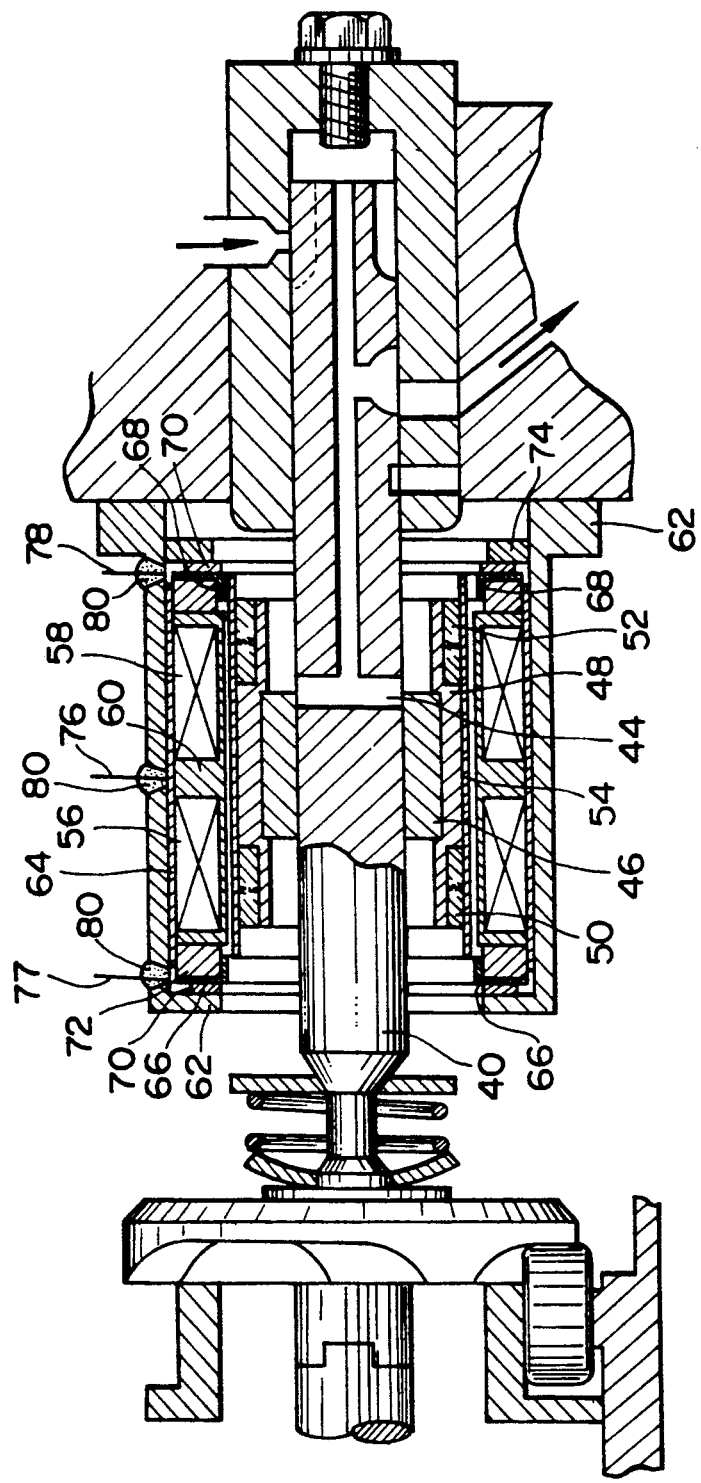
FIG. 3 is a sectional elevation of an embodiment of the present invention.

FIG. 3 shows an embodiment of the present invention. In this arrangement a fuel injection pump plunger 40 is reciprocatively disposed in a bore in a manner similar to that previously described in connection with the prior art. Accordingly, a detailed description of same will be omitted for brevity. A sleeve valve is slidably disposed on the plunger 40 in a manner to control a drain passage 44. This valve comprises a non-magnetic cylindrical valve sleeve 46 on which an essentially cylindrical stepped pole piece 48 is fixed. Two permanent magnets 50, 52 are fixed as shown on the shoulders of the pole piece 48 so as to define an essentially flat cylindrical surface. The magnets 50, 52 are arranged such that the poles (N,S) thereof are radially aligned and reversed with respect to each other. Viz., magnet 50 is arranged (merely by way of example) so that the N pole thereof is located radially outboard of the corresponding S pole, while magnet 52 is arranged so that the S pole thereof is located radially outboard of the corresponding N pole.

Snugly disposed about the pole piece 48 and permanent magnets 50, 52 is an electrically conductive but non-magnetic sleeve 54 (made of alumnimum for example).

Two electromagnetic coils 56, 58 are wound on an electrically conductive non-magnetic bobbin 60. This bobbin serves a "first" electrode as will become clear hereinlater. The bobbin 60 is disposed within a hollow cylindrical yoke 62 formed of a "soft" magnetic material and insulated therefrom via the interposition of an insulating cylindrical sleeve 64. Two auxiliary or "second" electrodes 66, 68 are disposed, in a spaced contact free relationship with respect to the so called "first" electrode, within the yoke. These electrodes 66, 68 are, as shown, maintained in position via the interposition of annular insulating members 70, 72. An annular metallic spacer 74 disposed in the mouth of the yoke 62 serves to secure the bobbin 60 and "second" electrodes 66,68 therewithin.

Lead wires 76, 77, 78 are disposed through apertures formed in the yoke 62 and electrically connected to the bobbin 60 and electrodes 66, 68, respectively. These lead wires are insulated from the yoke by insulating plugs 80.

With the above described arrangement, upon suitable energization of the solenoid coils 56, 58 (such as is well known in the art of fuel injection), the unit defined within the electrically conductive non-magnetic sleeve 54 is induced to move along the plunger 40 and therefore control the opening/closing timing of the drain passage 44 by the valve sleeve 46.

Figure 4:
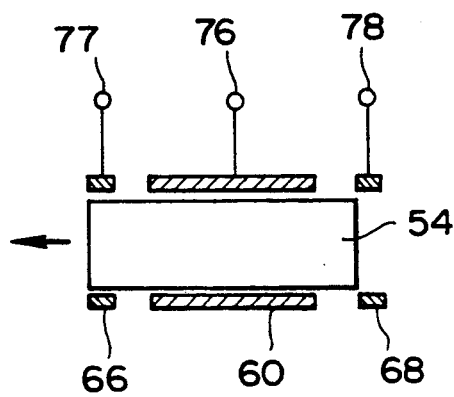
FIGS. 4 and 5 show schematically the operation of the arrangement shown in FIG. 3.
Figure 5:
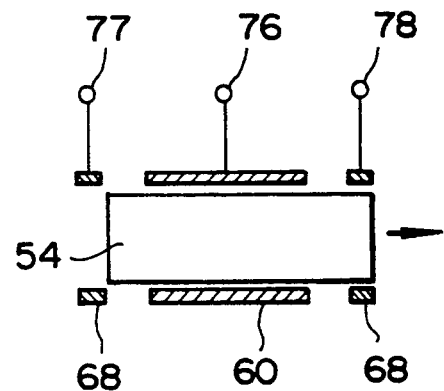

FIGS. 4 and 5 schematically show the position sensor arrangement (per se) as disposed in the above disclosed device. As will be appreciated, irrespective of the position of the sleeve 54 within the yoke 62, the interfacial area defined between the inner periphery of the bobbin 60 (or "first" electrode as it will be referred to hereinafter) and the electrically conductive non-magnetic sleeve 54 remains constant, while that defined between the so called "second" electrodes 66, 68 and the sleeve 54 vary with change in position of the sleeve. By sensing the variation in electrostatic capacitance produced between the electrodes 60 and 66 with respect to that produced between electrodes 60 and 68, the position of the sleeve may be detected.

Figure 6:
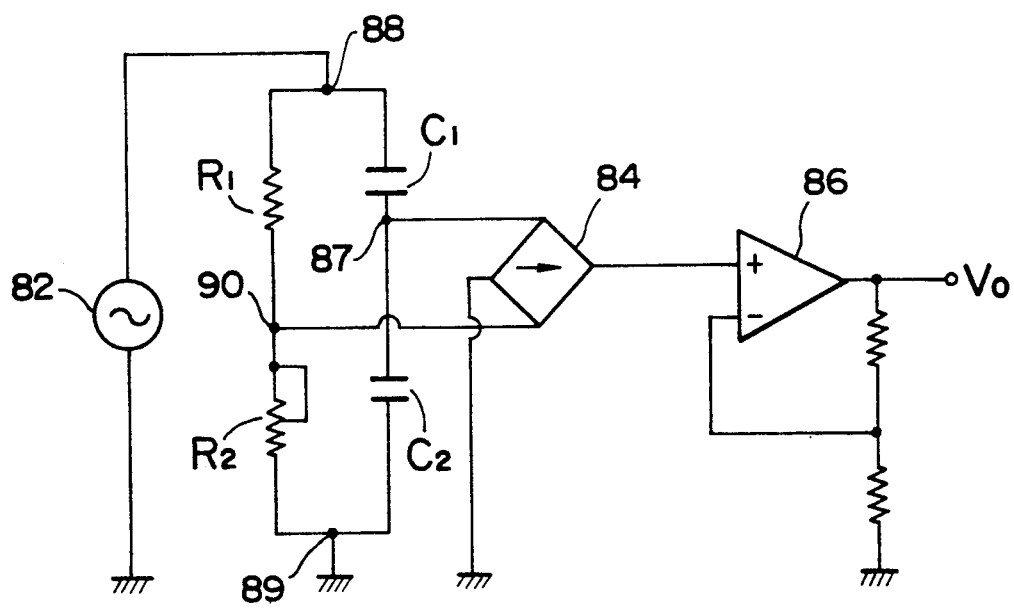
FIG. 6 shows an example of circuitry suitable for use in the embodiment of the present invention.

FIG. 6 schematically shows a circuit arrangement suitable for use with the above disclosed arrangement. This circuit takes the form of an AC source 82, a bridge circuit including series connected fixed resistor $R_1$ and variable resistor $R_2$ connected in parallel with series connected capacitors $C_1$ and $C_2$ (which in fact represent the aforementioned capacitances of electrodes 60–66 and 60–68—viz., the electrodes 60, 66, 68 may be deemed as being connected at junctions 87, 88, 89 respectively), and a full wave rectifier 84 connected to earth and junctions 87 90, as shown. The output of the rectifier 84 is fed to a DC amplifier 86 which produces an analog voltage Vo.

With this arrangement the variable resistor $R_2$ may be adjusted so that when the sleeve is moved in one direction and assumes one extreme position thereof, the bridge circuit produces a zero volatage (Viz., produces a zero potential across junctions 87,90).

Thus, given that:
e is the output of the bridge circuit,
Vs is the volatage applied by the AC source,
C1 is the capacitance of capacitor $C_1$,
C2 is the capacitance of capacitor $C_2$, and
K is a constant;
it can be shown that:

$$e = K + \frac{C1 - C2}{C1 + C2} \cdot Vs \qquad (1)$$

However, as the term C1+C2 is constant as will be appreciated from the construction of the disclosed embodiment, it may be shown that:

$$e = K_1(C1-C2)\cdot Vs + K_2 \qquad (2)$$

wherein $K_1$ and $K_2$ are constants.

Accordingly, as the voltage varies linearly with the change in interfacial area between the sleeve 54 and the "second" electrodes 66, 68 the analog voltage V$_o$ outputted by the amplifier 86 will vary with the position of the valve sleeve 46 with respect to the three electrodes.

In connection with the disclosed embodiment it is possible to advantageously form the insulating members 70, 72 and each of the electrodes 66, 68 as a single unit by coating electrically conductive metal films (e.g. platinum) on cermaic bases (e.g. alumina). Further, the method of detecting the position of the movable member (sleeve 54) is not limited to the above described arrangement. That is to say, the position may be detected by using the change in frequency of a signal produced by a CR oscillator or the change in delay produced by a delay circuit.

Although the above disclosed embodiment exhibits a very compact construction via the dual use of bobbin as both (a) a part of the motor used to drive the valve sleeve along the plunger and (b) one of the electrodes vital to the invention, the invention itself is not limited to use within moving magnetic type motors and may find application wherever the position of a moving element need be detected.

The present invention is deemed advantageous in that, in the event it is used in an environment wherein the media between the electrodes is apt to undergo a change in dielectric constant due to temperature fluctuation and/or content thereof (viz., such as the inclusion of water or alcohol in desiel or gasoline fuels as is apt to occur in the disclosed embodiment), no erroneous output will occur due to the compensative nature of the arrangement.

The present invention may take the form of an arrangement wherein only two electrodes are used. With this kind of arrangement the position of the movable member may be sensed by comparing the constant capacitance of the "first" electrode with the change in the "second".

What is claimed is:

1. In a device
   a movable member; and
   an arrangement for sensing the position of said member, said arrangement comprising:
      a first electrode disposed in close proximity to said movable member and in a manner that the interfacial area defined between said first electrode and said member remains constant irrespective of the position of said member;
      a second electrode disposed in close proximity to said member and in a manner that the interfacial area defined between said second electrode and said member varies with the position of said member;

a third electrode disposed in close proximity to said member and in a manner that the interfacial area defined between said third electrode and said member varies with the position of said member, said second and third electrodes being arranged so that as the interfacial area defined between said second electrode and said member increases the interfacial area defined between said third electrode and said member decreases, and vice versa; and a first circuit for outputting a signal indicative of the position of said member, said circuit being responsive to a capacitance which varies with the difference in interfacial area defined between (a) said first electrode and said member (b) said second electrode and said member, (c) said first and second electrodes and said member, and (d) said first and third electrodes and said member and wherein the first circuit comprises:

a bridge circuit, said bridge circuit including first and second resistors and first and second capacitors, said second resistor being manually variable, said first capacitor being defined by said first and second electrodes and said movable member, and said second capacitor being defined by said second and third electrodes and said movable member;

a source of alternating current, said source of alternating current being connected to a first terminal of said bridge circuit located between said first resistor and said first capacitor; and a full wave rectifier, said full wave rectifier being operatively connected to a second terminal of the bridge circuit which is located between said first and second resistors and to a third terminal located between said first and second capacitors, said full wave rectifier producing a signal indicative of the difference in capacitance between said first and second capacitors.

2. In a device a movable member; and an arrangement for sensing the position of said member, said arrangement comprising:

a first electrode disposed in close proximity to said movable member and in a manner that the interfacial area defined between said first electrode and said member remains constant irrespective of the position of said member;

a second electrode disposed in close proximity to said member and in a manner that the interfacial area defined between said second electrode and said member varies with the position of said member;

a first circuit for outputting a signal indicative of the position of said member, said circuit being responsive to a capacitance which varies with the difference in interfacial area defined between (a) said first electrode and said member and (b) said second electrode and said member;

a second circuit for producing a drive signal, said second circuit being responsive to an input signal and the output of said first circuit; and a solenoid disposed about said member in a manner to induce movement thereof, when energized by said drive signal, said solenoid having a part which defines said first electrode.

3. In a device a movable member which defines a working element of the device;

a linear acting electric motor, said motor comprising:

a coil selectively connectable with a source of electrical energy, said coil being insulatingly wound on an electrically conductive non-magnetic bobbin, and a pole piece on which a magnet is fixed, said pole piece being disposed within said coil and operatively connected to said movable member;

a position sensor for sensing the position of the pole piece, said position sensor comprising:

an electrically conductive non-magnetic sleeve disposed on said pole piece coaxially within and in a proximate contact free relationship with said bobbin, said bobbin serving as a reference electrode of the position sensor; and a first sensing electrode formed of an electrically conductive non-magnetic material disposed coaxially with respect to said sleeve and in proximate and contact free relationship with a first axial end of said bobbin.

4. A device as claimed in claim 3 further comprising:

a second sensing electrode formed of an electrically conductive non-magnetic material disposed coaxially about said sleeve and in proximate and contact free relationship with a second axial end of said bobbin.

5. In a device a movable member; and an arrangement for sensing the position of said member, said arrangement comprising:

a first electrode disposed in close proximity to said movable member and in a manner that the interfacial area defined between said first electrode and said member remains constant irrespective of the position of said member;

a second electrode disposed in close proximity to said member and in a manner that the interfacial area defined between said second electrode and said member varies with the position of said member; and a first circuit for outputting a signal indicative of the position of said member, said circuit being responsive to a capacitance which varies with the difference in interfacial area defined between (a) said first electrode and said member and (b) said second electrode and said member;

a second circuit for producing a drive signal, said second circuit being responsive to an input signal and the output of said first circuit; and a solenoid disposed about said member in a manner to induce movement thereof, when energized by said drive signal, said solenoid having an electrically conductive bobbin which defines said first electrode.

* * * * *